(12) United States Patent
Akritanakis

(10) Patent No.: US 9,307,705 B2
(45) Date of Patent: Apr. 12, 2016

(54) PRESSURE COMPENSATING DRIP IRRIGATION EMITTER

(71) Applicant: Eurodrip Industrial Commercial Agricultural Societe Anonyme, Inofyta Viotias (GR)

(72) Inventor: Konstantinos Akritanakis, Inofyta Viotias (GR)

(73) Assignee: Eurodrip Industrial Commercial Agricultural Societe Anonyme, Inofyta Viotias (GR)

( * ) Notice: Subject to any disclaimer, the term of this patent is extended or adjusted under 35 U.S.C. 154(b) by 178 days.

(21) Appl. No.: 14/044,617

(22) Filed: Oct. 2, 2013

(65) Prior Publication Data

US 2015/0090815 A1    Apr. 2, 2015

(51) Int. Cl.
*A01G 25/02*    (2006.01)
(52) U.S. Cl.
CPC .............. *A01G 25/023* (2013.01); *Y10T 29/494* (2015.01)
(58) Field of Classification Search
CPC ................ A01G 25/02; A01G 25/023; A01G 2025/006; B05B 1/14; B05B 15/069
See application file for complete search history.

(56) References Cited

U.S. PATENT DOCUMENTS

| 5,413,282 | A | * | 5/1995 | Boswell ................ | B05B 1/3006 239/542 |
| 5,820,029 | A | * | 10/1998 | Marans ................ | A01G 25/023 239/542 |
| 6,736,337 | B2 | | 5/2004 | Vildibill et al. | |
| 6,945,476 | B2 | * | 9/2005 | Giuffre ................ | A01G 25/023 239/542 |
| 7,108,205 | B1 | | 9/2006 | Hashimshony et al. | |
| 7,270,280 | B2 | | 9/2007 | Belford | |
| 7,735,758 | B2 | | 6/2010 | Cohen | |
| 8,141,589 | B2 | | 3/2012 | Socolsky | |
| 2002/0070297 | A1 | * | 6/2002 | Bolinis ................ | A01G 25/023 239/542 |
| 2006/0144965 | A1 | * | 7/2006 | Keren ..................... | A01G 25/02 239/542 |
| 2006/0163388 | A1 | * | 7/2006 | Mari ..................... | A01G 25/023 239/542 |
| 2008/0105768 | A1 | | 5/2008 | Kertscher | |
| 2012/0097254 | A1 | | 4/2012 | Cohen | |
| 2012/0267454 | A1 | | 10/2012 | Einav et al. | |

\* cited by examiner

*Primary Examiner* — Darren W Gorman
(74) *Attorney, Agent, or Firm* — Nydegger & Associates

(57) ABSTRACT

A pressure compensating drip emitter for controlling fluid flow through a hole in an irrigation line includes an enclosing sidewall that has two ends, surrounds a volume, and is formed with an internal ledge between the ends to support an elastomeric membrane. A pressure-reducing fluid passageway that is formed as a labyrinth is provided that includes an outer, annular portion that is in fluid communication with an emitter inlet and an inner annular portion that is in fluid communication with an emitter outlet. The membrane is deformable between a first low-pressure membrane configuration which allows fluid to bypass the inner annular portion in flowing from the outer portion to the outlet. In a second high-pressure membrane configuration, the deformed membrane covers the inner fluid passageway forcing the fluid to flow through both the outer and inner fluid passageway portions.

17 Claims, 8 Drawing Sheets

PRESSURE COMPENSATING DRIP IRRIGATION EMITTER

FIELD OF THE INVENTION

The present invention pertains generally to devices for use as drip irrigation emitters. More particularly, the present invention pertains to relatively small, inexpensive drip irrigation emitters that provide a substantially constant drip flow-rate over a relatively wide range of line pressures. The present invention is particularly, but not exclusively, useful as a relatively small drip irrigation emitter having a relatively large filtering area to ensure that emitter input water is properly filtered.

BACKGROUND OF THE INVENTION

Drip irrigation emitters can be used on relatively low pressure fluid supply lines (e.g. lines having a pressure between about 0.5 to 4 bar) to deliver water and/or nutrients directly to individual plants. To use, each emitter may be inserted into and bonded to the water line at regular intervals or can be mounted on the outside of the line, for example, using a barbed stem formed on the emitter. In this way, each emitter acts as a point source of water for each plant. Because emitter systems only deliver irrigation water to locations where water is needed, these systems conserve water as compared with conventional watering systems which cover a wide area with water. In addition, emitter systems generally experience less evaporative losses as compared to conventional watering systems.

As the fluid in an emitter system travels through the supply line away from the fluid source, the pressure in the line decreases. Stated differently, the fluid pressure is greatest where fluid enters the supply line and the pressure gradually decreases with distance therefrom. This pressure drop occurs due to frictional forces that develop between the flowing water and supply line and because water is being emitted along the length of the line. In addition, other factors such as elevation can also result in fluid pressure variations. When non-pressure compensating emitters are used, the drip rate also varies and is unstable due to the variation in pressure along the line. These changes in drip rate can be problematic because some plants will receive more fluid than others. To be expected, it is desirable that all emitters have a relatively uniform drip rate along the length of the fluid line. To overcome the variation in drip rate that occurs with non-pressure compensating emitters, typically only relatively short fluid lines are employed when using non-pressure compensating emitters.

To reduce the ill-effects caused by variations in line pressure, pressure compensating drip irrigation emitters (also referred to as so-called "flow regulated emitters") have been developed that produce a somewhat uniform flow over a range of line pressures. With pressure compensation, longer fluid lines can be employed while still providing substantially uniform drip rates. This, in turn, allows for large areas to be irrigated with a relatively low flow rate in the supply line. Because only a low flow rate is required in the supply line when using pressure compensating drip irrigation emitters, the energy cost of pumps and associated equipment is minimized.

One important factor worthy of consideration when using irrigation emitters is water filtration. In this regard, it can be important to properly filter fluid from the supply line to avoid clogs within the emitter and increase the emitter's lifespan. This, in turn, implies that the emitter includes a relatively large filtering area to ensure a sufficient volume of filtered fluid is available for processing by the emitter. Proper filtration is essential because debris or other matter present in the fluid line can block or restrict flow through the emitter reducing output flow.

It is also desirable to reduce or minimize the size and thickness of drip emitters for several reasons. For one, reducing the size and thickness of an emitter is advantageous because it results in savings in the cost of materials. Low cost drip emitters, in turn, allow for single use applications, in which a fluid line may be removed from the field for disposal or recycling after one or more growing seasons. In addition, reducing the size and thickness of an emitter simplifies and lowers the cost of packaging and shipping. Also, for fluid lines having an integrated emitter, it is a common procedure to roll the fluid line for packaging and shipping. However, each emitter has a thickness that may cause a bulge or lump that increases the difficulty of rolling and packaging the fluid line, especially for thin walled fluid lines. With this in mind, a drip irrigation emitter is needed having reduced size and thickness to facilitate packaging and shipping of thin walled drip tape or conduit.

In light of the above it is an object of the present invention to provide a pressure compensating drip emitter having a relatively small thickness to reduce material costs and improve shipping and handling characteristics. It is another object of the present invention to provide a pressure compensating drip emitter having a relatively small thickness and a relatively large filtering area to ensure that a proper supply of filtered fluid is provided for processing by the emitter. Still another object of the present invention is to provide a pressure compensating drip irrigation emitter having a relatively small thickness that can perform with sufficient pressure compensation in relatively low fluid line pressures to allow reduced operational cost by allowing low energy consumption water pumps. It is yet another object of the present invention to provide a pressure compensating drip irrigation emitter which is easy to use, relatively simple to manufacture, and comparatively cost effective.

SUMMARY OF THE INVENTION

The present invention is directed to a relatively small, pressure compensating drip emitter with two-stage flow regulation for emitting fluid from an irrigation line. The small emitter dimensions reduce material costs and costs associated with transportation/shipping. In one embodiment, the emitter can be a so-called 'inline type emitter' that is bonded inside the irrigation line during manufacture of the irrigation line. In another embodiment, the emitter can be a so-called 'online type emitter' that is mounted on the outside of the irrigation line, receiving fluid from the line through a hole formed in the wall of the irrigation line.

In more structural terms, the emitter includes a body part, a substantially flat, elastomeric membrane and a cover. For the emitter, the body part includes a cylindrical, enclosing sidewall that surrounds a volume and defines a central axis for the emitter. The sidewall extends from a first end to a second end and is formed with an internal ledge formed on the inside surface of the sidewall between the sidewall ends. With this arrangement, the emitter includes an inlet that extends into the volume between the ledge and the first sidewall end and an outlet that extends into the volume between the ledge and the second sidewall end.

For the present invention, a pressure-reducing fluid passageway that is formed as a labyrinth is provided in the volume between the ledge and the second sidewall end. In more detail, the fluid passageway includes a first portion that is in fluid communication with the inlet and a second portion that is in fluid communication with the outlet. To establish fluid communication between the first fluid passageway portion and the emitter inlet, a through-hole is provided in the elastomeric membrane. In one embodiment, the first portion (outer portion) of the fluid passageway follows an annular path having a radius, $r_1$, and the second portion (inner portion) of the fluid passageway follows an annular path having a radius, $r_2$, with $r_1 > r_2$. With this arrangement, the emitter can achieve low flow rates over a wide range of line pressures.

Walls establishing the above-described fluid passageway can be formed, for example, as part of the emitter cover. For the outer portion of the fluid passageway, the walls have a substantially uniform height. On the other hand, for the inner portion of the fluid passageway, the height of the fluid passageway walls varies as a function of radius from the central axis. Specifically, the wall height for the inner portion increases with increasing radial distance from the central axis. With this arrangement, the edges of the wall of the inner portion simulate a dome-shaped surface.

With the arrangement described above, the membrane can be positioned in the volume and on the ledge. This interactive cooperation of structure allows the membrane to deform from a first low-pressure membrane configuration to a second high-pressure membrane configuration. In the first low-pressure membrane configuration, the membrane is substantially flat and covers only the outer portion of the fluid passageway. The inner portion, which has a dome-shaped curvature relative to the flat membrane, is not covered. The result is that fluid bypasses the inner portion of the fluid passageway under low pressure conditions, and flows directly from the outer fluid passageway portion to the outlet.

When a relatively high fluid pressure exists in the irrigation line, a pressure differential is established across the emitter membrane which deforms the membrane into the second high-pressure membrane configuration. Specifically, this pressure differential arises due to the flow of fluid through the outer fluid passageway portion. Because the outer portion is formed as a labyrinth, fluid flowing through the labyrinth experiences a pressure drop. This then establishes a pressure differential across the membrane between the inlet (high pressure) and outlet (low pressure).

In the second high-pressure membrane configuration, the deformed membrane covers the dome-shaped, inner portion of the fluid passageway, eliminating bypass and forcing fluid to flow through the entire fluid passageway (i.e. both the outer and inner portions). In this manner, a uniform flow is achieved over a range of line pressures. At low pressures, fluid bypasses in the inner fluid passageway portion while at high pressures, fluid is forced to transit through inner fluid passageway portion where its pressure and flow rate are reduced.

In another aspect, for the present invention, the inlet can be formed with a filter to remove particulates from the fluid entering the emitter. In one implementation, the inlet includes an input plate that closes the first end of the sidewall and is formed with a plurality of openings through which the fluid passes. In addition, the inlet can include a plurality of spaced-apart posts that extend from the plate and are arranged in an annular pattern to surround the openings. For the emitter inlet, each post extends from the plate to a post tip that is located at a same distance, d, from the plate as the ledge. The membrane then covers the posts, forcing fluid entering the emitter to travel through the spaces between the posts. With the structural combination, a two-stage filter is established with the openings providing a first filtration stage for fluid entering the emitter and the spaced-apart posts providing a second filtration stage for fluid entering the emitter. As described above, the filter openings function to drain the emitter of fluid during periods of reduced line pressure. In one embodiment, the emitter inlet can include an annular shaped wall that extends from the plate and surrounds the openings. The annular wall then functions to establish an inlet reservoir between the annular wall and sidewall to hold fluid in the reservoir during periods of reduced line pressure.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1A:
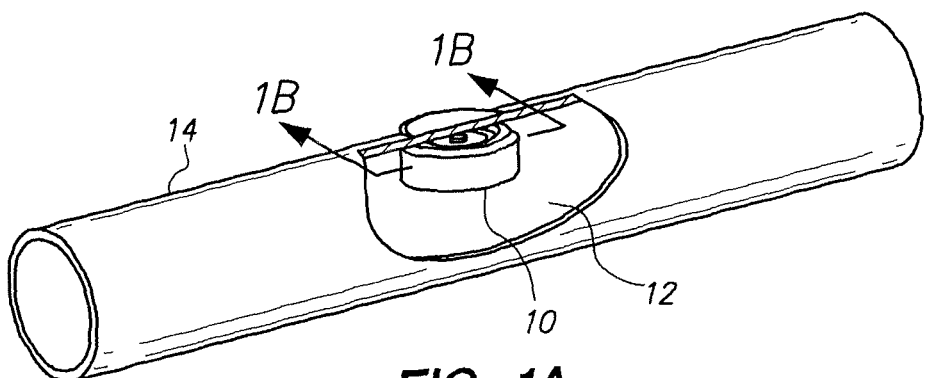
FIG. 1A is a perspective view of an inline type, disc shaped, pressure compensating irrigation drip emitter in accordance with the present invention, shown installed on an irrigation line.
Figure 1B:
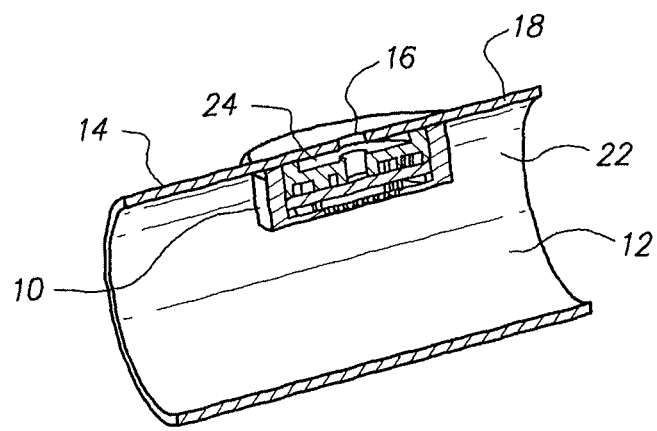
FIG. 1B is a cross-sectional view of the emitter and line as shown in FIG. 1A, as seen along line 1B-1B in FIG. 1A.

Referring initially to FIG. 1A, a disc-shaped pressure compensating irrigation drip emitter in accordance with the present invention is shown and designated 10. As seen in FIG. 1A, the emitter 10 is shown installed within the internal space 12 of an irrigation line 14. For the embodiment shown in FIG. 1A, the emitter 10 is a so-called 'inline type emitter' that can be bonded inside the irrigation line 14 during extrusion or immediately following extrusion of the irrigation line 14. FIG. 1B shows that a hole 16 is formed in the wall 18 of the irrigation line 14 to allow fluid from the internal space 12 to exit the irrigation line 14 through the emitter 10.

Figure 2:
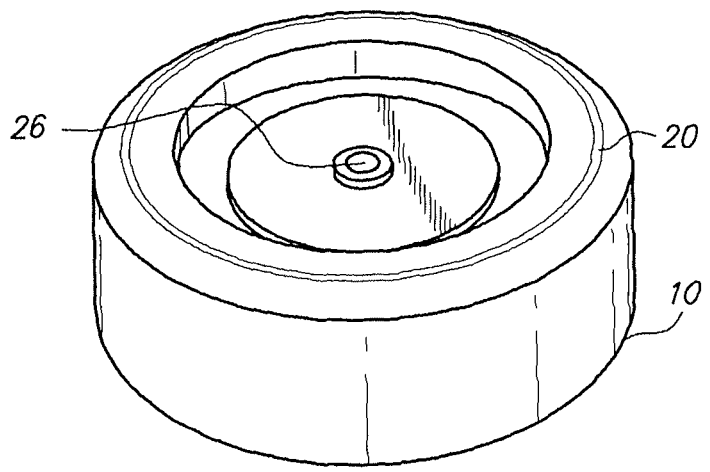
FIG. 2 is a perspective view of the emitter shown in FIG. 1A.

Cross-referencing FIGS. 1B and 2, it can be seen that the emitter 10 can be formed as a disc having a surface 20 that is configured to be bonded to the inside wall surface 22 (shown in FIG. 1B). With this arrangement, a sealed chamber 24 is established forcing fluid from the emitter outlet 26 to pass through the hole 16 in the line 14.

Figure 3:
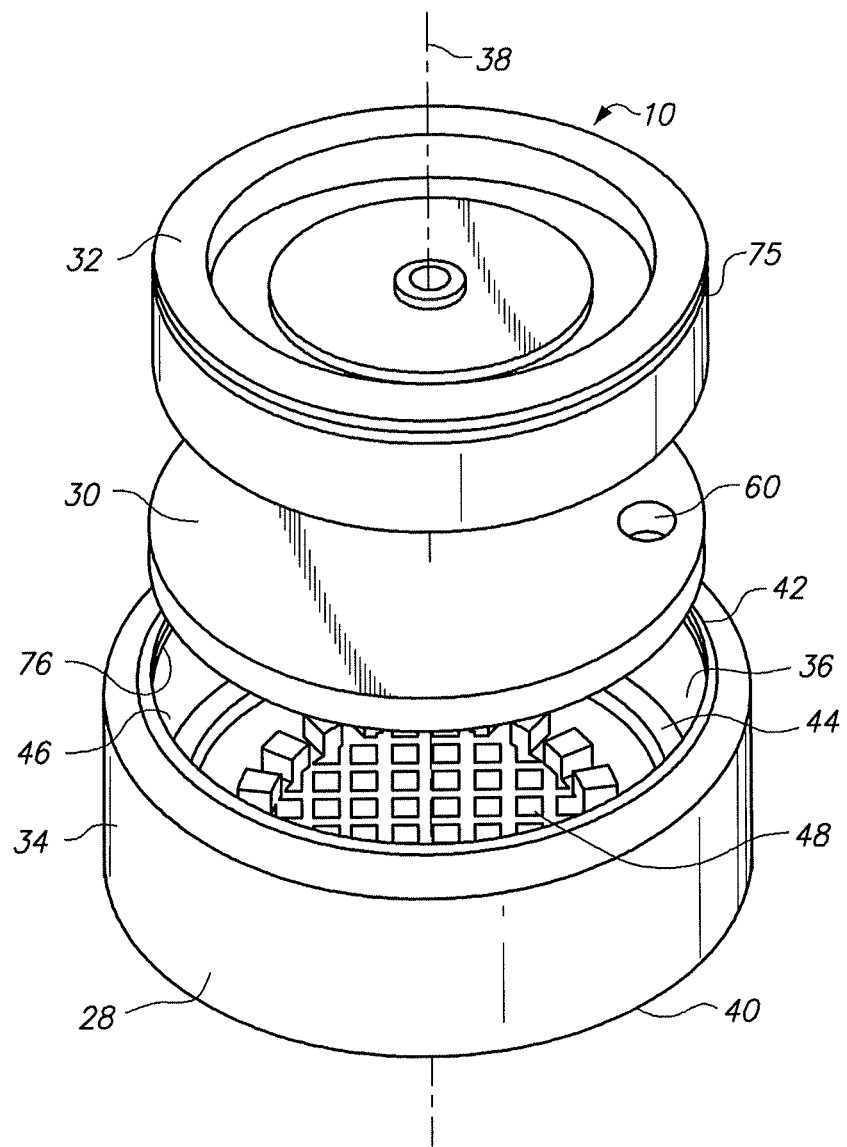
FIG. 3 is a top, exploded view of the emitter shown in FIG. 1A.
Figure 4:
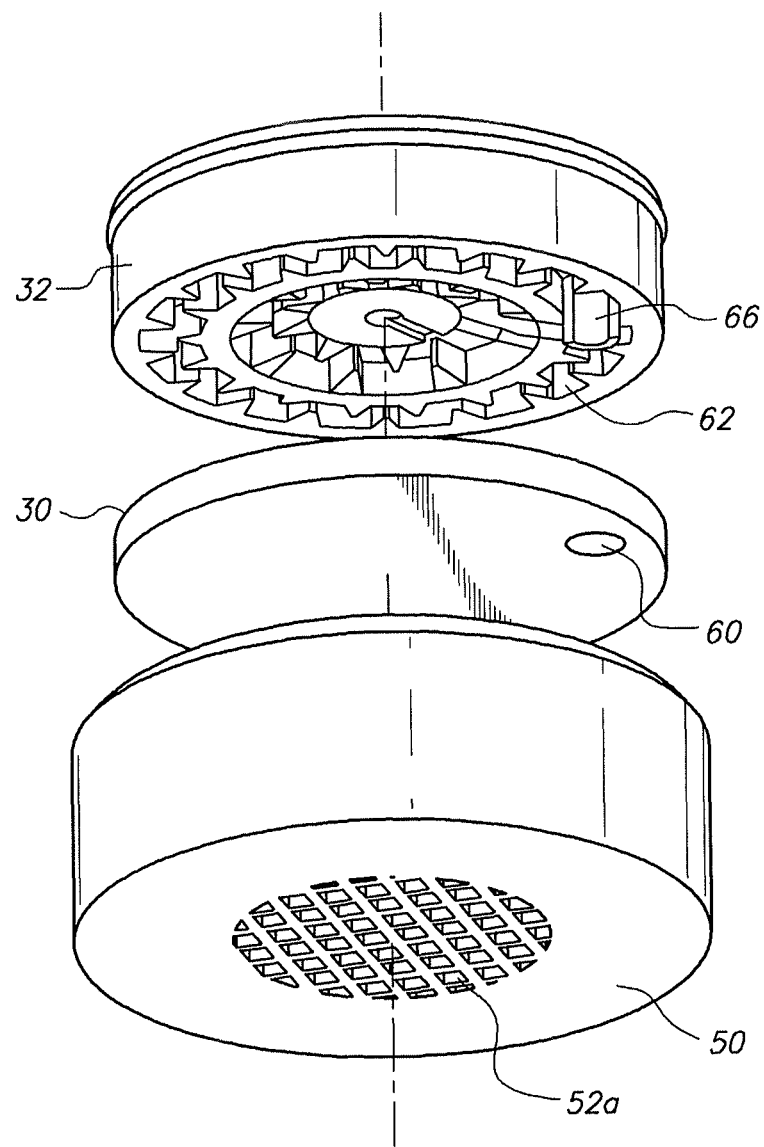
FIG. 4 is a bottom, exploded view of the emitter shown in FIG. 1A.

FIGS. 3 and 4 show that the emitter 10 includes a body part 28, a substantially flat, elastomeric membrane 30 and a cover 32. Also shown, the body part 28 includes a cylindrical, enclosing sidewall 34 that surrounds a volume 36 and defines a central axis 38 for the emitter 10. As best seen in FIG. 3, the sidewall 34 extends from a first end 40 to a second end 42 and is formed with an internal ledge 44 formed on the inside surface 46 of the sidewall 34 between the sidewall ends 40, 42. With this arrangement, the emitter 10 includes an inlet 48 that extends into the volume 36 between the ledge 44 and the first sidewall end 40. Also shown, outlet 26 extends into the volume 36 between the ledge 44 and the second sidewall end 42.

Figure 5:
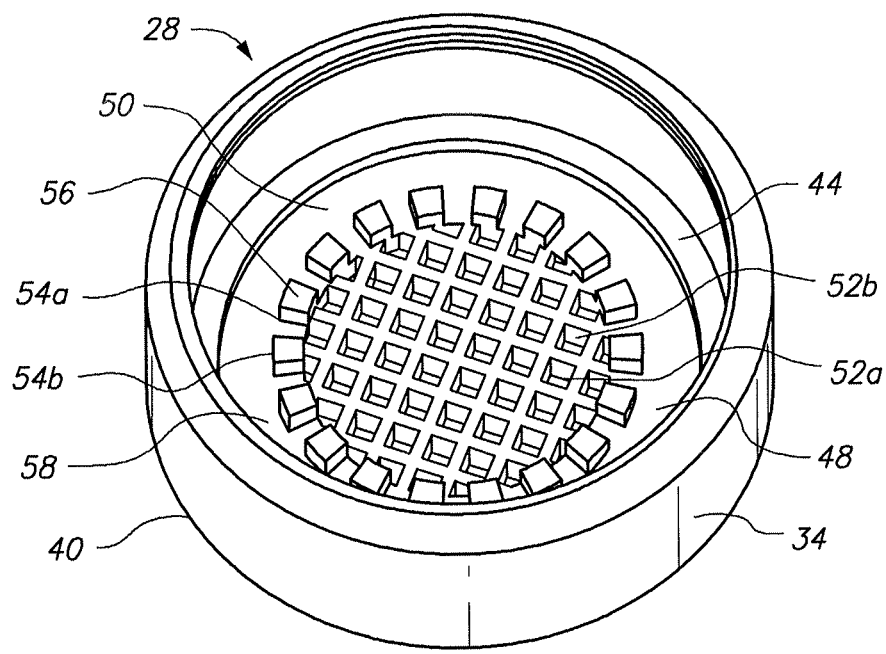
FIG. 5 is perspective view of a body part of the emitter shown in FIG. 1A.

With reference now to FIG. 5, it can be seen that the inlet 48 can include two-stage filtration to remove particulates from fluid entering the emitter 10. As shown, the inlet 48 includes an input plate 50 that closes the first end 40 of the sidewall 34 and is formed with a plurality of openings (of which opening 52a and 52b are labeled) sized to stop debris while allowing fluid to pass. Also shown, the inlet 48 can include a plurality of spaced-apart posts (of which posts 54a and 54b are labeled) that extend from the plate 50 and are arranged in an annular pattern to surround the openings 52a,b. As shown, post 54a extends from the plate 50 to a post tip 56 that is located at a same distance from the plate 50 as the ledge 44.

Figure 7A:
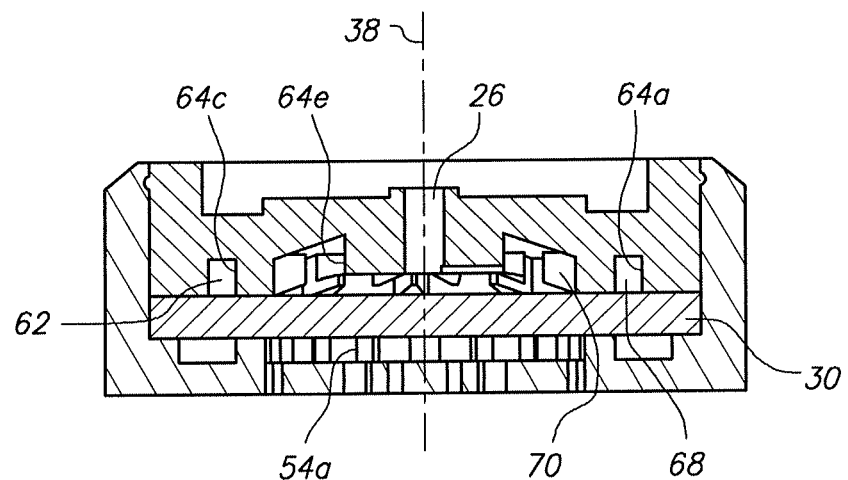
FIG. 7A is a cross-sectional view, as in FIG. 1B, of the emitter with the membrane in a low-pressure configuration.

Cross-referencing FIGS. 5 and 7A, it can be seen that the membrane 30 sits on the ledge 44 and covers the posts 54a,b, forcing fluid entering the emitter 10 through the openings 52a,b (first filtration stage) to travel through the spaces between the posts 54a,b (second filtration stage) before reaching the annular space 58 between the posts 54a,b and sidewall 34.

Figure 6:
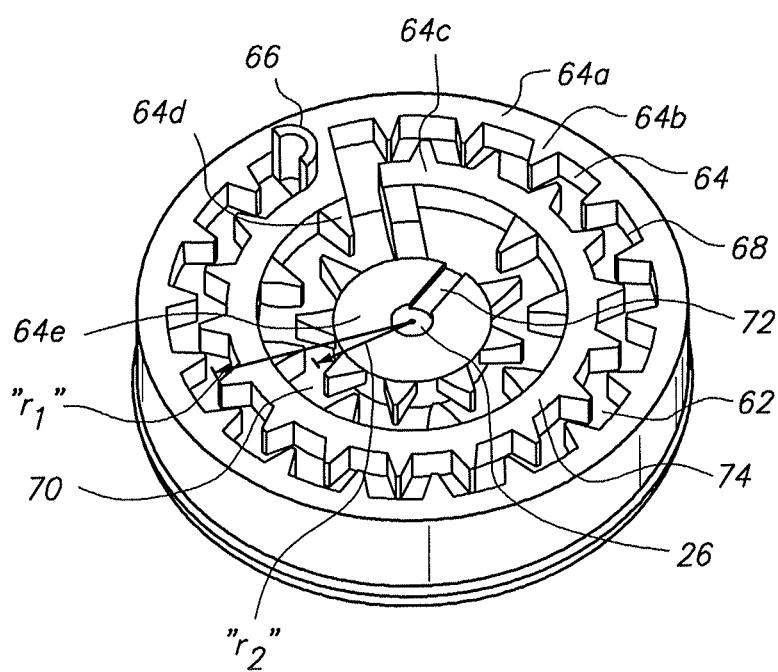
FIG. 6 is perspective view of a cover of the emitter shown in FIG. 1A.

Cross-referencing FIGS. 4-6, it can be seen that fluid from the annular space 58 flows via through-hole 60 formed in membrane 30 into pressure-reducing fluid passageway 62 that is formed by a wall 64 in cover 32. As best seen in FIG. 4, cylindrical protrusion 66 extends from the wall 64 for insertion into through-hole 60 to aid in alignment of the through-hole 60 with the entrance of the fluid passageway 62 during assembly of the emitter 10.

As best seen in FIG. 6, the pressure-reducing fluid passageway 62 is formed as a meandering path (a so-called labyrinth) in the volume 36 (see FIG. 3) between the ledge 44 and the second sidewall end 42. In more detail, the fluid passageway 62 includes a first, outer portion 68 that follows a generally annular path having a radius, $r_1$, and the second inner portion 70 that follows an annular path having a radius, $r_2$, with $r_1 > r_2$. As shown, the inner portion 70 is in fluid communication with the outlet 26 via channel 72.

Cross-referencing FIGS. 6 and 7A, it can be seen that for the fluid passageway 62, the walls 64a-c surrounding the outer portion 68 have a substantially uniform height. On the other hand, for the inner portion 70 of the fluid passageway 62, the height of the fluid passageway walls 64c-e varies as a function of radius from the central axis 38. Specifically, the wall height for the inner portion 70 increases with increasing radial distance from central axis 38. With this arrangement, the edges 74 of the wall 64c-e surrounding the inner portion 70 simulate a dome-shaped surface that is concave relative to the membrane 30.

Figure 7B:
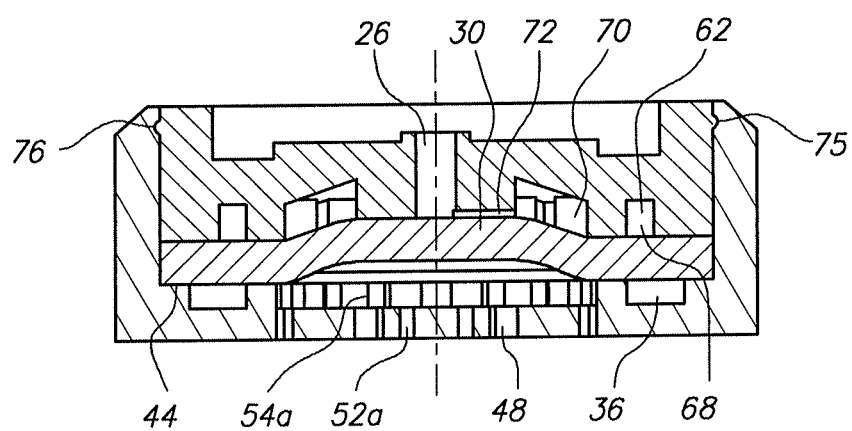
FIG. 7B is a cross-sectional view, as in FIG. 1B, of the emitter with the membrane in a high-pressure configuration.

FIGS. 7A and 7B illustrate the interaction between the membrane 30 and inner fluid passageway portion 70 and outer fluid passageway portion 68. Specifically, FIG. 7A shows the membrane 30 during low pressure in the irrigation line 14 (FIG. 1A) and FIG. 7B shows the membrane 30 during high pressure in the irrigation line 14. As shown, the membrane 30 is positioned in the volume 36 and on the ledge 44 and posts 54a. It can be seen in FIGS. 7A and 7B that the posts 54a can be positioned at about the same radial distance from the axis 38 and the wall 64c separating the inner portion 70 from the outer portion 68.

FIGS. 7A and 7B show that the membrane 30 deforms from a first low-pressure membrane configuration (FIG. 7A) to a second high-pressure membrane configuration (FIG. 7B). In the first low-pressure membrane configuration shown in FIG. 7A, the membrane 30 is substantially flat and covers only the outer portion 68 of the fluid passageway 62. The inner portion 70, which has a dome-shaped, concave curvature relative to the flat membrane 30, is not covered. The result is that fluid is able to bypass the inner portion 70 under low pressure conditions, and flow directly from the outer portion 68 to the outlet 26.

FIG. 7B shows the membrane 30 when a relatively high fluid pressure exists in the irrigation line 14 (FIG. 1A). As shown, a pressure differential is established across the emitter membrane 30 which deforms the membrane 30 into the second high-pressure membrane configuration. Specifically, this pressure differential arises due to the flow of fluid through the outer portion 68 of the fluid passageway 62. Because the outer portion 68 is formed as a labyrinth, fluid flowing through the labyrinth experiences a pressure drop. This then establishes a pressure differential across the membrane 30 between the inlet 48 (high pressure) and outlet 26 (low pressure).

Continuing with FIG. 7B, in the second high-pressure membrane configuration, the deformed membrane 30 covers the dome-shaped, inner portion 70 of the fluid passageway 62, eliminating bypass and forcing fluid to flow through the entire fluid passageway 62 (i.e. both the outer portion 68 and inner portion 70). Each portion (i.e. the outer portion 68 and inner portion 70) reduces the pressure and flow of fluid exiting the emitter at the outlet 26. At pressures in between those shown (i.e. FIG. 7A, low pressure, full bypass and FIG. 7B, high pressure, no bypass), some bypass will occur. In this manner, a uniform flow is achieved over a range of line pressures. In addition, in some cases, at line pressures higher than shown in FIG. 7B, the membrane 30 can enter and partially block the channel 72 resulting in further pressure compensating flow regulation.

Assembly of the emitter 10 can best be appreciated with cross-reference to FIGS. 3 and 7B. As seen there, the cover 32 can be formed with an annular tab 75 that is received by an annular groove 76 formed on the body part 28. The elasticity of the molded plastic cover 32 and body part 28 allow the cover 32 to be snapped in place within the body part 28.

Figure 8:
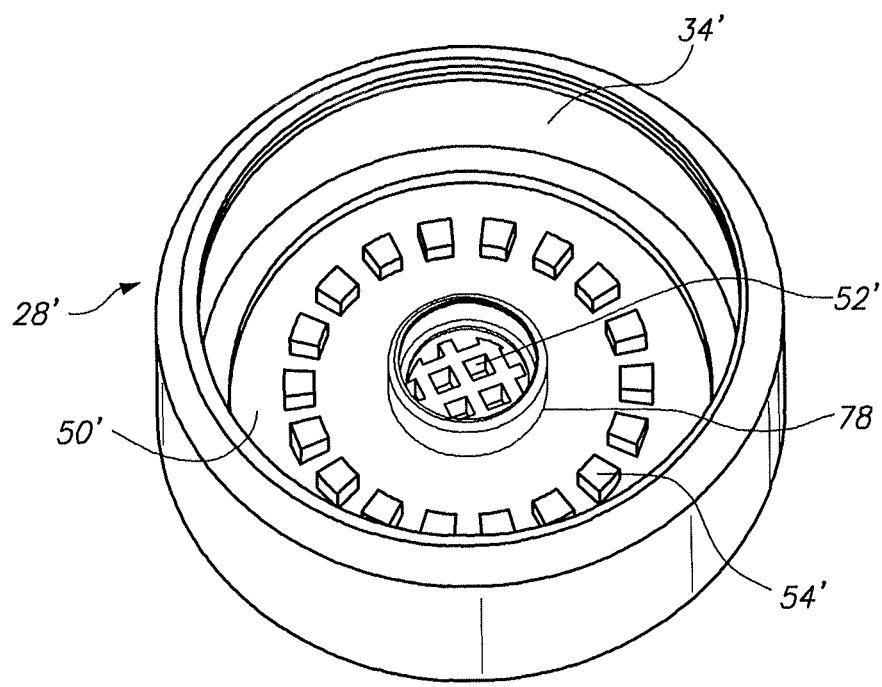
FIG. 8 is perspective view of another embodiment of a body part for use in the emitter shown in FIG. 1A having an inlet formed with an annular wall to create a reservoir for holding fluid during periods of reduced line pressure.

FIG. 8 shows another embodiment of a body part 28' for use in the emitter 10 shown in FIG. 1A. As shown, the body part 28' can include an annular shaped wall 78 that extends from the plate 50' and surrounds the openings 52'. Also shown, posts 54' can be annularly arranged between the wall 78 and the sidewall 34'. The annular wall 78 then functions to establish an inlet reservoir between the annular wall 78 and sidewall 34' to hold fluid in the reservoir during periods of reduced line pressure. On the other hand, for the body part 28 shown in FIG. 5, fluid is able to drain from the emitter 10 during periods of reduced line pressure.

Figure 9:
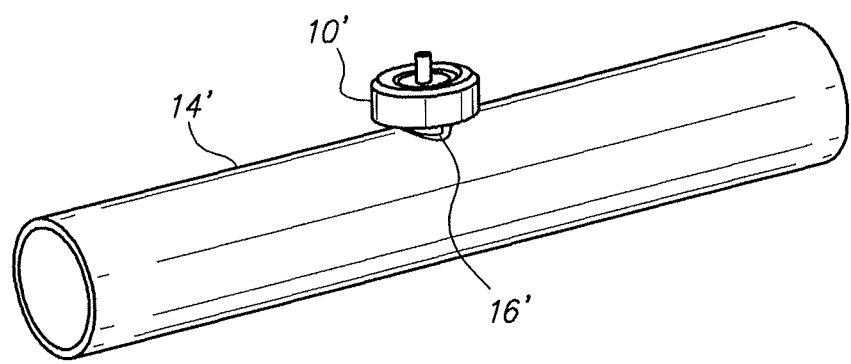
FIG. 9 is a perspective view of an online type, disc shaped, pressure compensating irrigation drip emitter in accordance with the present invention, shown installed on an irrigation line.
Figure 10:
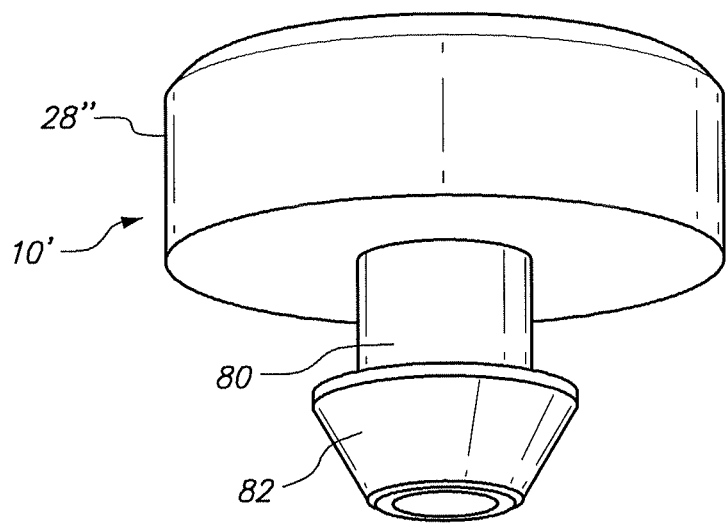
FIG. 10 is a perspective view of the online emitter shown in FIG. 9.

FIGS. 9-11B show another embodiment of a disc-shaped pressure compensating irrigation drip emitter 10' in accordance with the present invention. As seen in FIG. 9, the emitter 10' can be installed on an irrigation line 14'. For the embodiment shown in FIG. 9, the emitter 10' is a so-called 'online type emitter' that can be affixed to the irrigation line 14' after extrusion of the line 14', for example, at the point of use. Cross referencing FIGS. 9 and 10, it can be seen that the emitter 10' can be affixed to the line 14' by inserting an inlet tube 80 formed with a barb 82 into a hole 16' formed in the irrigation line 14'.

Figure 11A:
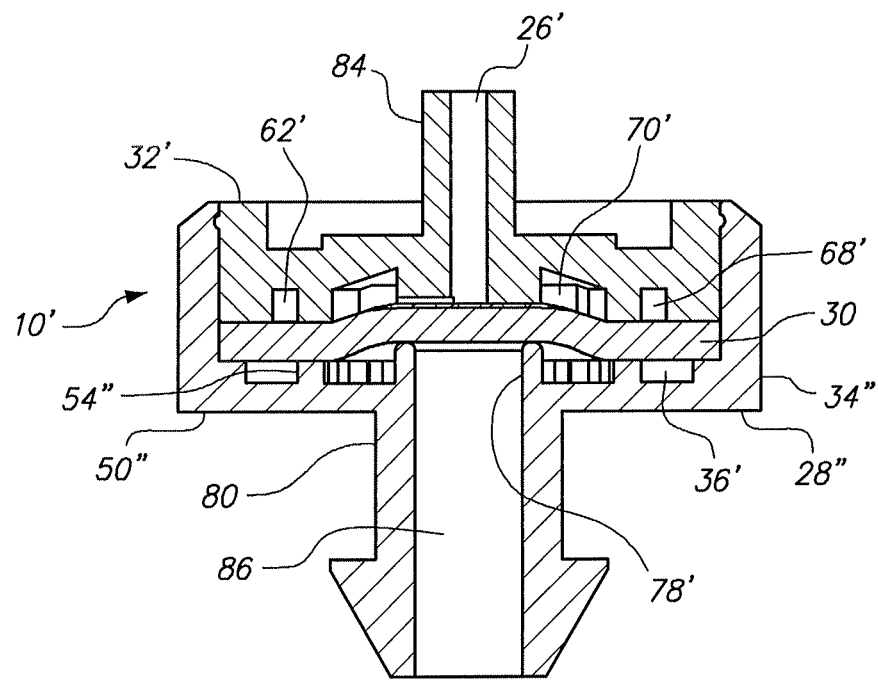
FIG. 11A is a cross-sectional view, as in FIG. 1B, of the online emitter shown in FIG. 9, shown with the membrane in a low-pressure configuration.

As best seen in FIG. 11A, the emitter 10' includes a body part 28'', membrane 30 and cover 32'. The membrane 30 and cover 32' are identical to the membrane 30 and cover 32 described above with reference to FIGS. 1-7B with the exception that the cover 32' shown in FIGS. 9-11B includes an optional outlet extension tube 84. As shown in FIG. 11A, the body part 28' includes a sidewall 34'' surrounding a volume 36'. A passageway 86 is formed in the barbed inlet tube 80 to allow fluid from the line 14' (FIG. 9) to enter the volume 36'. An annular shaped wall 78' is provided that extends from the plate 50'' to establish an inlet reservoir between the annular wall 78' and sidewall 34'' to hold fluid in the reservoir during periods of reduced line pressure. Also shown, posts 54'' are annularly arranged between the wall 78' and the sidewall 34''.

Figure 11B:
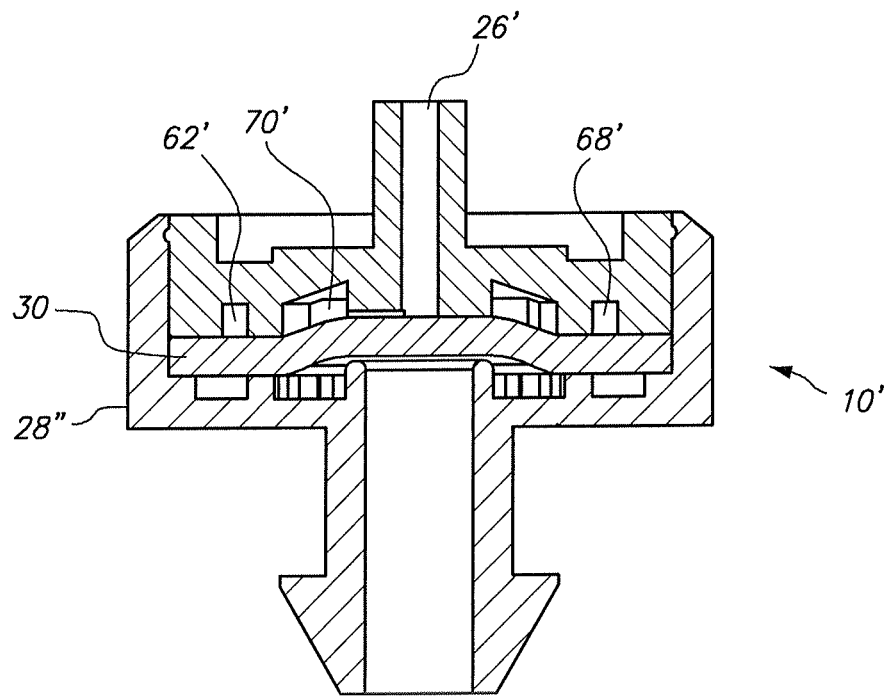
FIG. 11B is a cross-sectional view, as in FIG. 11A, of the online emitter shown in FIG. 9, shown with the membrane in a high-pressure configuration.

FIGS. 11A and 11B illustrate that functionally, the emitter 10' operates in response to variation in line pressure in the same manner as the emitter 10 shown in FIGS. 7A and 7B and described above. Specifically, FIGS. 11A and 11B show that the membrane 30 deforms from a first low-pressure membrane configuration (FIG. 11A) to a second high-pressure membrane configuration (FIG. 11B). In the first low-pressure membrane configuration shown in FIG. 11A, the membrane 30 is substantially flat and covers only the outer portion 68' of the fluid passageway 62'. The inner portion 70', which has a dome-shaped, concave curvature relative to the flat membrane 30, is not covered. The result is that fluid is able to bypass the inner portion 70' under low pressure conditions, and flow directly from the outer portion 68' to the outlet 26'.

On the other hand, as shown in FIG. 11B, in the second high-pressure membrane configuration, the deformed membrane 30 covers the dome-shaped, inner portion 70' of the fluid passageway 62', eliminating bypass and forcing fluid to flow through the entire fluid passageway 62' (i.e. both the outer portion 68' and inner portion 70'). Each portion (i.e. the outer portion 68' and inner portion 70') reduce the pressure and flow of fluid exiting the emitter at the outlet 26'. In this manner, a uniform flow is achieved over a range of line pressures.

While the particular pressure compensating drip irrigation emitter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An emitter for establishing a pressure compensating, regulated fluid flow from an irrigation line, said emitter comprising:
   an enclosing sidewall surrounding a volume, said sidewall having a first end, a second end and formed with a ledge therebetween;
   an inlet extending into said volume between said ledge and said first end of said sidewall and an outlet extending into said volume between said ledge and said second end of said sidewall;
   a fluid passageway formed as a labyrinth and having a first portion in fluid communication with said inlet and a second portion in fluid communication with said outlet, wherein the first portion of the fluid passageway follows an annular path having a radius, $r_1$, and the second portion of the fluid passageway follows an annular path having a radius, $r_2$, with $r_1 > r_2$; and
   a membrane positioned in said volume between said second end of said sidewall and said ledge, said membrane covering the first fluid passageway portion and deformable between a first low-pressure membrane configuration in which fluid bypasses the second fluid passageway portion in flowing from the first fluid passageway portion to the outlet and a second high-pressure membrane configuration in which fluid flows through the second fluid passageway portion to the outlet.

2. An emitter as recited in claim 1 wherein the inlet comprises an input plate formed with a plurality of openings to filter fluid entering the emitter.

3. An emitter as recited in claim 2 wherein the inlet comprises a plurality of spaced-apart posts extending from the plate and arranged in an annular pattern to surround the openings, the openings providing a first filtration stage for fluid entering the emitter and the spaced-apart posts providing a second filtration stage for fluid entering the emitter.

4. An emitter as recited in claim 3 wherein each post extends from the plate to a post tip located at a distance, d, from the plate and the ledge is located at the same distance, d, from the plate.

5. An emitter as recited in claim 2 wherein said emitter inlet comprises an annular shaped wall surrounding the openings, the wall extending from the plate to establish an inlet reservoir between the annular wall and the sidewall to hold fluid in the reservoir during periods of reduced line pressure.

6. An emitter as recited in claim 1 wherein the membrane is formed with a through-hole to establish fluid communication between the inlet and the first portion of the fluid passageway.

7. An emitter as recited in claim 1 wherein the sidewall is cylindrically shaped.

8. An emitter as recited in claim 1 wherein the emitter is an in-line emitter having a surface for bonding the emitter to an inside surface of the irrigation line to establish a seal between the emitter and irrigation line with the outlet in fluid communication with a hole formed in the irrigation line.

9. An emitter as recited in claim 1 wherein the emitter is an on-line emitter wherein said inlet includes a hollow tube extending from the enclosing wall to pass through a hole formed in the irrigation line to allow fluid in the irrigation line to enter the emitter inlet.

10. An emitter as recited in claim 9 wherein the tube is formed with a barb to secure the on-line emitter to the irrigation line.

11. An emitter as recited in claim 1 wherein a channel establishes fluid communication between the second portion of the fluid passageway and the outlet.

12. An emitter for establishing a pressure compensating, regulated fluid flow from an irrigation line, said emitter comprising:
   a body part having an enclosing sidewall and an inlet, the sidewall surrounding a volume and having a first end, a second end and formed with a ledge therebetween, the inlet extending into said volume between said ledge and said first end of said sidewall;
   a cover mounted on said body part at said second end of the sidewall, said cover having a fluid passageway and an outlet, the fluid passageway formed as a labyrinth and having a first portion in fluid communication with said inlet and a second portion in fluid communication with said outlet, wherein the first portion of the fluid passageway follows an annular path having a radius, $r_1$, and the second portion of the fluid passageway follows an annular path having a radius, $r_2$, with $r_1 > r_2$; and a membrane positioned in said volume between said second end of said sidewall and said ledge, said membrane covering the first fluid passageway portion and deformable between a first low-pressure membrane configuration in which fluid bypasses the second fluid passageway portion in flowing from the first fluid passageway portion to the outlet and a second high-pressure membrane configuration in which fluid flows through the second fluid passageway portion to the outlet.

13. An emitter as recited in claim 12 wherein the inlet includes an input plate mounted on the body part at the first end of the sidewall, the plate formed with a plurality of openings and wherein the inlet includes a plurality of spaced-apart posts extending from the plate toward the second end of the sidewall and arranged in an annular pattern to surround the openings, the openings providing a first filtration stage for fluid entering the emitter and the spaced-apart posts providing a second filtration stage for fluid entering the emitter.

14. An emitter as recited in claim 12 wherein the membrane is formed with a through-hole to establish fluid communication between the inlet and the first portion of the fluid passageway.

15. A method of manufacturing an irrigation system having at least one pressure compensating, regulated fluid flow emitter on an irrigation line, said method comprising the steps of:

establishing a hole in the irrigation line;

providing an emitter having a body part with an enclosing sidewall and an inlet, the sidewall surrounding a volume and having a first end, a second end and formed with a ledge therebetween, the inlet extending into said volume between said ledge and said first end of said sidewall; a cover mounted on said body part at said second end of the sidewall, said cover having a fluid passageway and an outlet, the fluid passageway formed as a labyrinth and having a first portion in fluid communication with said inlet and a second portion in fluid communication with said outlet, wherein the first portion of the fluid passageway follows an annular path having a radius, $r_1$, and the second portion of the fluid passageway follows an annular path having a radius, $r_2$, with $r_1 > r_2$; and a membrane positioned in said volume between said second end of said sidewall and said ledge, said membrane covering the first fluid passageway portion and deformable between a first low-pressure membrane configuration in which fluid bypasses the second fluid passageway portion in flowing from the first fluid passageway portion to the outlet and a second high-pressure membrane configuration in which fluid flows through the second fluid passageway portion to the outlet; and affixing the emitter to said irrigation line at said hole.

16. A method as recited in claim 15 wherein the step of affixing the emitter to said irrigation line at said hole is accomplished by bonding the cover to an inside surface on the irrigation line.

17. A method as recited in claim 15 wherein the inlet includes a hollow tube extending from the enclosing wall, the tube formed with a barb, and wherein the step of affixing the emitter to said irrigation line at said hole is accomplished by passing the barb through the hole in the irrigation line.

\* \* \* \* \*